United States Patent
Miller

(10) Patent No.: US 9,469,933 B2
(45) Date of Patent: Oct. 18, 2016

(54) METHOD AND APPARATUS FOR USING GRAVITY TO PRECISELY DOSE DETERGENT IN A WASHING MACHINE

(71) Applicant: Whirlpool Corporation, Benton Harbor, MI (US)

(72) Inventor: Christoph J. Miller, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 138 days.

(21) Appl. No.: 14/279,674

(22) Filed: May 16, 2014

(65) Prior Publication Data

US 2015/0330013 A1 Nov. 19, 2015

(51) Int. Cl.
| | |
|---|---|
| *D06F 39/02* | (2006.01) |
| *D06F 33/02* | (2006.01) |
| *D06F 39/00* | (2006.01) |
| *D06F 39/08* | (2006.01) |

(52) U.S. Cl.
CPC .............. *D06F 39/02* (2013.01); *D06F 33/02* (2013.01); *D06F 39/005* (2013.01); *D06F 39/028* (2013.01); *D06F 39/088* (2013.01); *D06F 2202/10* (2013.01); *D06F 2202/12* (2013.01); *D06F 2204/02* (2013.01); *D06F 2204/086* (2013.01)

(58) Field of Classification Search
None
See application file for complete search history.

(56) References Cited

U.S. PATENT DOCUMENTS

| | | | | |
|---|---|---|---|---|
| 4,009,598 A | * | 3/1977 | Bernard | D06F 39/02 134/103.1 |
| 5,279,324 A | * | 1/1994 | Schutz | E03C 1/104 137/48 |
| 8,196,441 B2 | * | 6/2012 | Hendrickson | D06F 39/02 68/17 R |
| 2004/0107993 A1 | * | 6/2004 | Stephens | D06F 39/083 137/217 |
| 2010/0000581 A1 | | 1/2010 | Doyle et al. | |
| 2011/0174344 A1 | | 7/2011 | Cerruti et al. | |
| 2012/0049999 A1 | | 3/2012 | Pelkey et al. | |
| 2012/0247158 A1 | * | 10/2012 | Ditze | D06F 33/02 68/17 R |

* cited by examiner

*Primary Examiner* — Michael Barr
*Assistant Examiner* — Cristi Tate-Sims

(57) ABSTRACT

An appliance for washing clothes includes a detergent storage tank and a drum. Between the detergent storage tank and the drum is a diverter valve which has a detergent inlet connected to the detergent storage tank, an air vent connected to ambient air, and a detergent outlet. The diverter valve has an energized state wherein the detergent inlet is open and the air vent is closed, and a de-energized state wherein the detergent inlet is closed and the air vent is open. The appliance also has a flow meter connected to the diverter valve and the drum.

13 Claims, 3 Drawing Sheets

METHOD AND APPARATUS FOR USING GRAVITY TO PRECISELY DOSE DETERGENT IN A WASHING MACHINE

BACKGROUND OF THE DISCLOSURE

Contemporary cleaning appliances, such as dishwashers or clothes washers, are a common convenience in many homes. A user simply loads the cleaning appliance with laundry to be treated into a treating chamber, along with an optional supply of one or more treating chemistries, such as detergents, bleach, enzymes, and anti-spotting agents and selects and initiates a cleaning cycle that may be subsequently automatically carried out by the cleaning appliance. An example of a typical cleaning cycle includes the steps of washing the laundry with heated liquid and optional treating chemistry and thereafter rinsing the laundry with heated liquid.

Cleaning appliances may be provided with a dispenser for automatically dispensing one or more treating chemistries during a cleaning cycle. There are generally two types of treating chemistry dispensing systems found in the cleaning appliances: single use dispensing systems and bulk dispensing systems. The single use dispensing system is by far the most common type and typically has one or more dispensing cups that may be filled with only enough treating chemistry, i.e. a "charge" or "dose", for a single cleaning cycle. Water is then flushed through the cup to dispense the treating chemistry. A user must fill these single use dispensing systems with treating chemistry prior to each cleaning cycle of the cleaning appliance, which may be a tedious task that many users would prefer not to perform. Users have also been known to forget to fill the cup, fill the cup with the wrong treating chemistry, or to fill the cup with the wrong amount of treating chemistry.

The bulk dispensing systems, while known, are not very common. The bulk dispensing systems hold multiple charges of treating chemistries. Some systems are capable of controlling and varying the amount of treating chemistry. These systems are more convenient to the user in the sense that the user only has to remember to fill them once over several cycles of operation. However, in many instances, they require the use of pumps and other sensors that may drive the cost of machines utilizing this technology upward.

SUMMARY OF THE PRESENT DISCLOSURE

One aspect of the present disclosure is directed toward a washing machine including a detergent storage tank, a detergent inlet, and air vent in the detergent inlet, a diverter valve, a controller, and a flow meter, where the machine uses gravity to feed detergent through the detergent inlet and the flow meter to precisely dose the detergent into the machine.

Another aspect of the present disclosure includes a solenoid in the diverter valve in electrical communication with the controller.

Yet another aspect of the present disclosure includes a user interface for a user to input information relating to a desired amount of detergent to be used.

Yet another aspect of the present disclosure includes a method of dosing detergent into a washing chamber of a washing machine, including determining an amount of detergent to be dispensed, opening a detergent inlet dispensing the detergent by energizing a diverter valve, determining how much detergent has been dispensed, comparing how much detergent has been dispensed with the determined dosage requirement, closing the detergent inlet, and venting the remaining fluid.

A further aspect of the present disclosure includes inputting a desired amount of detergent to be used by a user into a user interface.

Yet another aspect of the current disclosure includes determining the amount of detergent to be dispensed at the point of manufacture.

These and other aspects, objects, and features of the present disclosure will be understood and appreciated by those skilled in the art upon studying the following specification, claims, and appended drawings.

DETAILED DESCRIPTION OF EMBODIMENTS

Figure 1:
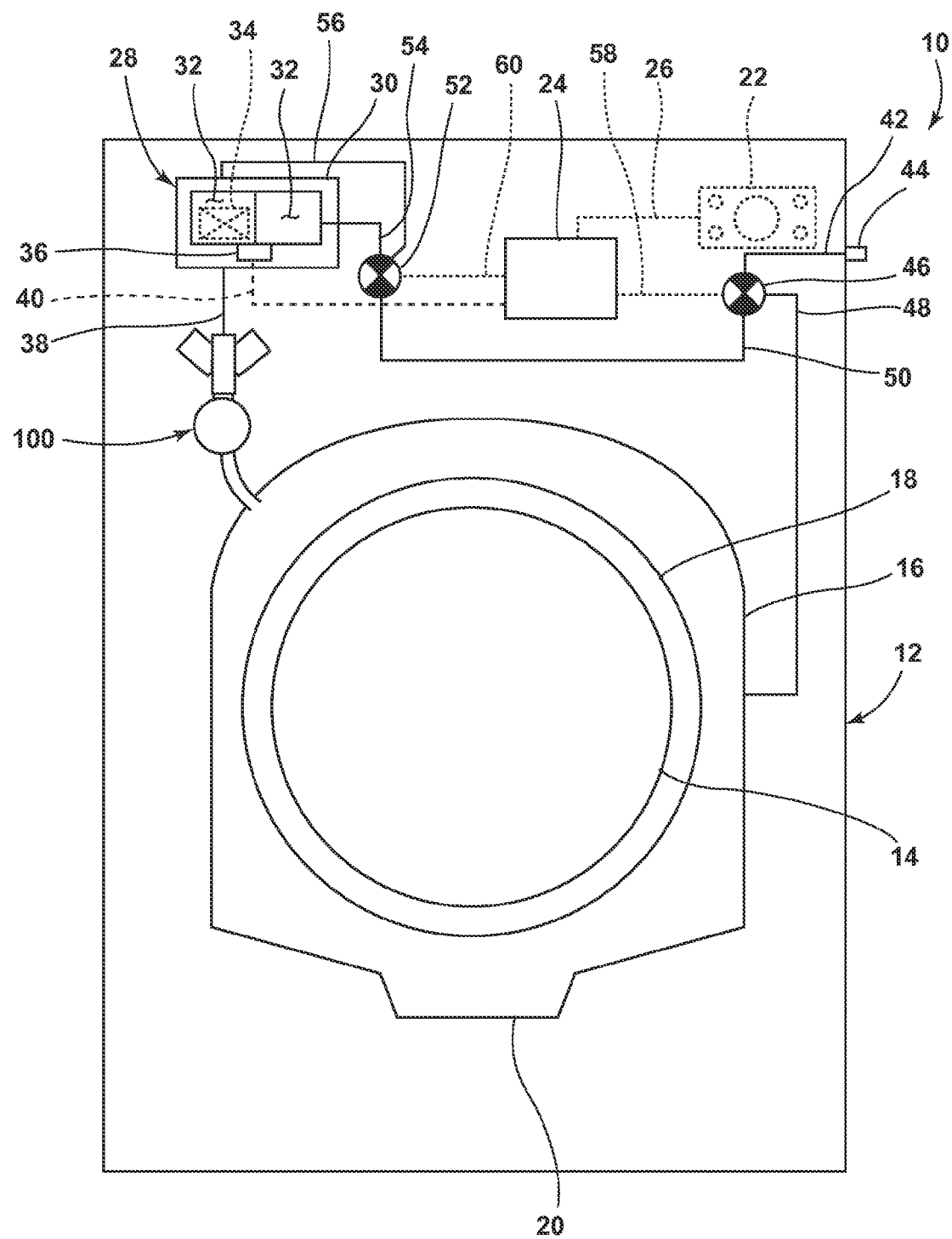
FIG. 1 is a schematic view of an automatic clothes washing machine according to the disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a first embodiment of the disclosure may be illustrated as a cleaning appliance in the environment of a horizontal axis automatic clothes washing machine 10. Although much of the remainder of this application will focus on the embodiment of an automatic clothes washing machine, the disclosure may have utility in other environments, including other cleaning appliances, such as dishwashers, for example. The automatic clothes washing machine 10 shares many features of a conventional automated clothes washer, which will not be described in detail herein except as necessary for a complete understanding of the disclosure. The disclosure may also be utilized in fabric treatment appliances such as a dryer, such as a tumble dryer or a stationary dryer, or a combination washing machine and dryer.

Further, washing machines are typically categorized as either a vertical axis washing machine or a horizontal axis washing machine. As used herein, the "vertical axis" washing machine refers to a washing machine having a rotatable drum that rotates about a generally vertical axis relative to a surface that supports the washing machine. However, the rotational axis need not be vertical. The drum can rotate about an axis inclined relative to the vertical axis. As used herein, the "horizontal axis" washing machine refers to a washing machine having a rotatable drum that rotates about a generally horizontal axis relative to a surface that supports the washing machine. In some horizontal axis washing machines, the drum rotates about a horizontal axis generally parallel to a surface that supports the washing machine. However, the rotational axis need not be horizontal. The drum can rotate about an axis inclined relative to the horizontal axis, with fifteen degrees of inclination being one example of inclination.

Vertical axis and horizontal axis machines are often best differentiated by the manner in which they impart mechanical energy to the fabric articles. In vertical axis machines, the fabric moving element moves within a drum to impart mechanical energy directly to the clothes or indirectly through wash liquid in the drum. In horizontal axis machines mechanical energy is typically imparted to the clothes by the tumbling action formed by the repeated lifting and dropping of the clothes, which is typically implemented by the rotating drum itself. The disclosure disclosed herein may be suitable for use in both horizontal axis and vertical axis automatic clothes washing machines. The disclosure will be illustrated and described, however, in the context of a horizontal axis washing machine.

The automatic clothes washing machine 10 may include a cabinet 12 defining an interior and enclosing components typically found in a conventional washing machine, such as motors, pumps, fluid lines, controls, sensors, transducers, and the like. A door 14 may be mounted to the cabinet to selectively close an access opening to the interior of a drum 16 that defines a treating chamber in which an article may be treated. Examples of articles include, but are not limited to, a hat, a scarf, a glove, a sweater, a blouse, a shirt, a pair of shorts, a dress, a sock, a pair of pants, a shoe, an undergarment, and a jacket. One or more articles form a laundry load. Both the drum 16 and a basket 18 may be located within the interior of the cabinet 12. The drum 16 may be associated with a sump 20 for holding a liquid used during a cleaning cycle. The sump 20 may be normally connected to a drain (not shown) to provide a flow path for removing the liquids from the washing machine 10.

While the drum 16 may be described as defining the treating chamber, with the basket 18 located within the drum, and thereby located within the treating chamber, it may be that just the basket need be considered the treating chamber as the laundry load is typically retained within the basket and the treating chemistry may be dispensed directly into the basket or indirectly through the drum.

While not shown, some clothes washers include a recirculation system for recirculation of liquid from the sump to the laundry in the basket 18. The recirculating spray may be used in combination with rotating the drum to draw the sprayed liquid through the laundry using centrifugal force. Alternatively, or in combination with the recirculation system, the liquid may be raised to a level within the drum 16 where a portion of the basket 18 may be submerged. The rotation of the basket 18 causes the laundry to tumble in the liquid. Either of the recirculation or tumble methods of cleaning may be used with the current disclosure.

A user interface 22 may be provided that has operational controls such as dials, lights, switches, and displays enabling a user to input commands to a controller 24 and receive information about a specific cleaning cycle from sensors (not shown) in the washing machine 10 or via input by a user through the user interface 22. The controller 24 may comprise a printed circuit board (PCB) with computer readable memory. The controller 24 may also comprise a series of electrical switches not tied to a PCB, or any other method of electronically controlling the system known in the art. To aid the input of information by the user, the user interface 22 may be electrically coupled with the controller 24 through user interface leads 26. The user may enter many different types of information, including, without limitation, cycle selection and cycle parameters, such as cycle options. Any suitable cycle may be used. Examples include, Heavy Duty, Normal, Delicates, Rinse and Spin, Sanitize, and Bio-Film Clean Out, to name a few. The term "cleaning cycle" is used to mean one operational cycle of the automatic clothes washing machine 10 that cleans a load of laundry. While the user interface 22 is shown in on the front of the washing machine 10, the user interface 22 may be placed in any suitable area of the washing machine 10 easily accessible by a user.

The cabinet 12 may also include a dispensing system 28 for dispensing treating chemistry during a cleaning cycle. The treating chemistry may be any type of aid for treating laundry, and examples may include, but are not limited to one or more washing aids, such as detergents and oxidizers, including bleaches; additives, such as fabric softeners, sanitizers, de-wrinklers; and chemicals for imparting desired properties to the laundry, including stain resistance, fragrance (e.g., perfumes), insect repellency, and UV protection, among others.

The dispensing system 28 may include a dispenser housing 30 fluidly coupled to the drum 16. FIG. 1 illustrates the dispenser housing 30 as being located in the upper portion of the cabinet 12 such that a user may access it from the exterior of the cabinet 12, although other locations are also possible. The dispensing system 28 may further include a single use dispensing system fluidly coupled to the dispenser housing 30. The single use dispensing system is illustrated as having at least one dispensing cup 32 that stores a single dose of treating chemistry that the dispensing system 28 dispenses to the drum 16, as part of the execution of the cleaning cycle. The at least one dispensing cup 32 may be located within the dispenser housing 30 and may be fluidly coupled to the dispenser housing 30 such that when the at least one dispensing cup 32 overflows, the overflow goes to the dispenser housing 30. Further, the single use dispensing system may include multiple dispensing cups 32.

The dispensing system 28 may also include a bulk dispensing system fluidly coupled to the dispenser housing 30 for dispensing a charge of treating chemistry to the dispenser housing 30. For example, in the embodiment shown, the bulk dispensing system may be fluidly coupled to the dispenser housing 30 and may directly supply the treating chemistry it dispenses to the dispenser housing 30. The bulk dispensing system is illustrated as a bulk dispensing cartridge 34 that may be received in the at least one dispensing cup 32 and may fluidly couple with the dispenser housing 30 such that the bulk dispensing cartridge 34 may directly supply the treating chemistry to the dispenser housing 30. It should be noted that the dispensing system may not use cartridges as shown, but may be any other type of dispensing system known in the art such as non-removable storage tanks or the like.

Although the bulk dispenser cartridge has been illustrated or described as a rectangular box-like container, the bulk dispensing cartridge may be any type or configuration of removable container configured to store multiple doses of a treating chemistry. The container may have any shape and size that is receivable within the dispenser. The removable container may be flexible, rigid, expandable, or collapsible. The container may be made of any type of material. Some examples of suitable cartridges are, without limitation, a plastic container, a cardboard container, a coated cardboard container, and a bladder, all of which are capable of being received within the dispenser.

The bulk dispensing system may include a treating chemistry meter 36 operably coupled to the bulk dispensing cartridge 34 to control the dosing of the treating chemistry from the bulk dispensing cartridge 34. The treating chemistry meter 36 may be integrated with the bulk dispensing cartridge 34 or separate, and it may dispense into one of the cups 32, or the dispenser housing 30. The treating chemistry meter 36 may be a mechanical flow meter, a magnetic flow meter, or any other meter suitable for measuring liquid flow, all well known in the cleaning appliance art. As illustrated, the treating chemistry meter 36 dispenses into the dispenser housing 30, which in turn fluidly couples the drum 16 through a dispensing line 38.

Although the dispensing system 28 thus far has been described as including a dispenser housing 30, the dispenser housing 30 could be eliminated and replaced with a conduit. In that case, the at least one dispensing cup 32 of the single use dispensing system may be located such that when the at least one dispensing cup 32 overflows, the overflow goes to the dispensing line 38 or a similar conduit (not shown) that leads to the drum 16. Further, if the dispenser housing 30 is eliminated, the bulk dispensing cartridge 34 may directly supply the treating chemistry to the treating chamber or a conduit, such as the dispensing line 38, which leads to the treating chamber.

The treating chemistry meter 36 may also be a pump fluidly coupling the bulk dispensing cartridge 34 to the dispenser housing 30. The treating chemistry meter 36 may be operably coupled with the controller 24, through a control lead 40, such that the controller 24 may implement the cleaning cycle by controlling the operation of the treating chemistry meter 36 to control the dosing of the treating chemistry from the bulk dispensing cartridge 34 to the dispenser housing 30.

A water supply system typically provides water to the single use and bulk dispensing systems. The water supply system is illustrated as having a conduit 42 fluidly coupled with a water supply 44, and a valve 46. The water supply 44 may be fluidly coupled directly to the drum 16 through conduit 42 to valve 46 and then through a dispensing line 48. The water supply 44 may also be coupled to the drum 16 via the dispensing system 28, where water is supplied to the dispensing system 28 through conduit 42, valve 46, and conduit 50, to a diverter valve 52, which controls the flow of water to either the dispensing cups 32 through conduit 54 or to the dispenser housing 30 through conduit 56. The conduits 54 and 56 define alternative flow paths to the dispensing system 28. The flow path associated with conduit 54 supplies the cups 32 for the single use dispensing system. The flow path associated with conduit 56 supplies the bulk dispensing system. In the embodiment shown, regardless of which flow path is used, the fluid exits the dispensing system 28 through dispensing line 38 to the drum 16.

With this configuration, the water supply system may control the flow of water directly or indirectly to the drum, to the single use dispensing system, and to the bulk dispensing system. Thus, the valve 46 may introduce fresh water from the water supply 44 into the drum 16, or the dispensing system 28. The valve 46 may be electrically coupled with the controller 24 through a valve control lead 58. The controller 24 may control the operation of the valve 46 in response to instructions received from the user interface 22 as a result of selections made by the user, such as cleaning cycle, water temperature, spin speed, extra rinse, and the like. Alternatively, the user may override the automatic dispensing function for a single cleaning cycle. In this method, the selection of either the single use dispensing system or the bulk dispensing system may be inputted by the user through a separate button (not shown) on the user interface 22. In that case, the manual button may control the operation of the valve 46 in response to what system was selected by the user.

Looking at the flow paths in greater detail, the first water flow path along conduit 54 may flush the charge of treating chemistry from the cup 32 of the single use dispensing system into the dispenser housing 30 and then into the drum 16. The second water flow path 56 may flush the charge of treating chemistry, dispensed from the bulk dispensing cartridge 34 into the dispenser housing 30, from the dispenser housing 30 into the drum 16. The first water flow path 54, as illustrated in FIG. 1, supplies water to the dispenser housing 30 through the at least one dispensing cup 32. While the second water flow path 56, as illustrated, supplies water directly to the dispenser housing 30 and bypasses the at least one dispensing cup 32.

FIG. 1 illustrates that the first water flow path 54 and the second water flow path 56 may be independent prior to reaching the dispenser housing 30. Alternatively, the first water flow path 54 and the second water flow path 56 may become independent at some point within the dispenser housing 30. In FIG. 1, the diverter valve 52 marks the divergence of the first water flow path 54 and the second water flow path 56. The diverter valve 52 may be electrically coupled with the controller 24 through a valve control lead 60. The controller 24 may control the operation of the diverter valve 52 in response to instructions received from the user interface 22 as a result of selections made by the user, such as when manual dispensing may be desired water may be directed down the first water flow path 54 and when bulk dispensing may be desired water may be directed down the second water flow path 56.

The dispensing line 38 fluidly couples the dispenser housing 30, and both the single use dispensing system and bulk dispensing system, with the drum 16. Thus, fresh water may be delivered from the water supply 44 into the dispensing system 28 for flushing treating chemistry from the dispensing system 28 through the dispensing line 38 into the drum 16.

In operation, a user may elect to dispense treating chemistry to the drum 16, directly from the at least one dispensing cup 32 by manually supplying a single dose of treating chemistry to the at least one dispensing cup 32 from an external supply of treating chemistry. The user may select a manual dispense cleaning cycle on the user interface 22, which would then be processed by the controller 24.

When operating in manual dispensing mode during operation of the automatic clothes washing machine 10, when the time comes to dispense the treating chemistry, the controller 24 signals the valve 46 and the diverter valve 52 to supply water to the first water flow path 54. Water from the first water flow path 54 enters into the at least one dispensing cup 32 where the water may be directed towards the treating chemistry located in the at least one dispensing cup 32. The water and the treating chemistry then overflow the at least one dispensing cup 32, typically through a siphon post in the cup that drains into the housing, and enter the dispenser housing 30. Alternatively, other dispensing techniques known to those skilled in the art could also be used. Essentially, the automatic clothes washing machine 10 effects a flushing of the at least one dispensing cup 32, the dispenser housing 30, and the conduit formed by the dispenser housing 30 and the dispensing line 38. As such, both the water and the treating chemistry travel from the at least one dispensing cup 32 and into the drum 16. After exiting the dispenser housing 30 the treating chemistry may also go through any accompanying mixing devices, pumps, sprayers or conduits on its way to the drum 16.

Alternatively, the user may insert or may have already inserted the bulk dispensing cartridge 34 into another at least one dispensing cup 32 and elect to dispense treating chemistry to the drum 16, from the bulk dispensing cartridge 34. A selected volume of treating chemistry may be dispensed from the bulk dispensing cartridge 34 through operation of the treating chemistry meter 36 under the control of the controller 24. Typically, this could be accomplished by the user selecting a cleaning cycle on the user interface 22, which would then be processed by the controller 24, along with an optional determination in a known manner of the size of the load or other load parameters, to automatically dispense the appropriate volume of treating chemistry.

When operating in bulk dispensing mode during operation of the automatic clothes washing machine 10, when the time comes to dispense the treating chemistry, the controller 24 signals the treating chemistry meter 36 to supply treating chemistry from the bulk dispensing cartridge 34 to the dispenser housing 30. The controller 24 then signals the valve 46 and the diverter valve 52 to supply water to the second water flow path 56 wherein the water may be directed towards the treating chemistry located in the dispenser housing 30. Essentially, the automatic clothes washing machine 10 effects a flushing of the dispenser housing 30 and the dispensing line 38. The flushing of the dispenser housing 30 may also act to flush the treating chemistry meter 36, which fluidly couples the dispenser housing 30. Then, both the water and the treating chemistry travel through the dispenser housing 30 and through the dispensing line 38, and into the drum 16.

Further, both the single use dispensing system and the bulk dispensing system and the water from the first and second water flow paths could discharge into a pump (not shown). The pump may be operably coupled to the controller 15 such that the controller 15 may control the dispensing of the treating chemistry and water by the actuation of the pump to the treating chamber. Thus, the pump may deliver the treating chemistry and water mixture to the treating chamber under pressure.

The treating chemistry meter 36 may dose treating chemistry into the drum 16 multiple times during a single cleaning cycle. Dosing of the treating chemistry does not need to be done all at one time. For example, smaller amounts of treating chemistry, equal to a full single dose, or in other embodiments, a fraction of a full dose, may be dispensed by the treating chemistry meter 36 at separate times throughout the cleaning cycle. Further, multiple full doses may be dispensed during the cleaning cycle. As used herein, the term "single dose of treating chemistry", and variations thereof, refers to an amount of treating chemistry sufficient for one cleaning cycle of the automatic clothes washing machine 10 and the term "multiple doses of treating chemistry", and variations thereof, refers to an amount of treating chemistry sufficient for multiple cleaning cycles of the automatic clothes washing machine.

The determination of whether the single use dispensing system is used or the bulk dispensing system is used is described as being based on the cycle selected by the user, the determination may be made in many ways and is not germane to the disclosure. Alternately a manual/bulk mode of operation may be a discrete selection by the user. In other embodiments, the determination may be made by the controller 24 having one or more suitable sensors for detecting the type and quantity of treating chemistry in one or both of the single use or bulk dispensing system and applying control logic to this information to select which dispensing system to use. The controller 24 may also dispense from both dispensing systems during a single cycle. For example, it is contemplated that the bulk dispensing cartridge will hold detergent, as it is the most common treating chemistry, and the cups of the single use dispensing system will hold bleach and/or fabric softener, which are often optional for many of the cycles. In such a situation, the controller 24 would dispense detergent from the bulk dispensing system at the appropriate time in the cycle and, if there is treating chemistry in one or more of the cups, the controller 24 would dispense that treating chemistry using the single use dispensing system at the appropriate time in the cycle.

The two flow paths may provide for a simplified water system that reduces the redundancy in the water supply system. It also provides a simple mechanism by which the controller 24 can effect the dispensing from either the single use dispensing system or the bulk dispensing system. The controller 24 need only select the flow path to the desired system to effect dispensing. The two flow paths also work hand-in-hand with the bulk dispensing cartridge to provide a dispensing system that has an integrated single use dispensing system and a bulk dispensing, which are independently supplied water.

Alternatively, the housing may be absent from the dispensing system 28 and chemistry may be dispensed into the dispensing line 38 both when manual dispensing is desired and when bulk dispensing is desired. One of the cups 32, which directly fluidly couples the dispensing line 38, may be filled with treating chemistry when manual dispensing is desired. Water may then be directed into the cup 32, the water and treating chemistry may mix and be flushed into the dispensing line 38.

When bulk dispensing is desired the treating chemistry meter 36 may dispense treating chemistry directly from the bulk dispensing cartridge 34 to the dispensing line 38. Water may then be introduced from the water supply 44 into the dispensing line 38 where the water and dispensed treating chemistry may form a mixture before being flushed into the drum 16. A complete description of the possible flow paths and design for the dispensing cartridge 34 may be found in related U.S. patent application Ser. No. 12/165,780, entitled "WATER FLOW PATHS IN A HOUSEHOLD CLEANING APPLIANCE WITH SINGLE USE AND BULK DISPENSING," the entire disclosure of which is hereby incorporated by reference.

Figure 2A:
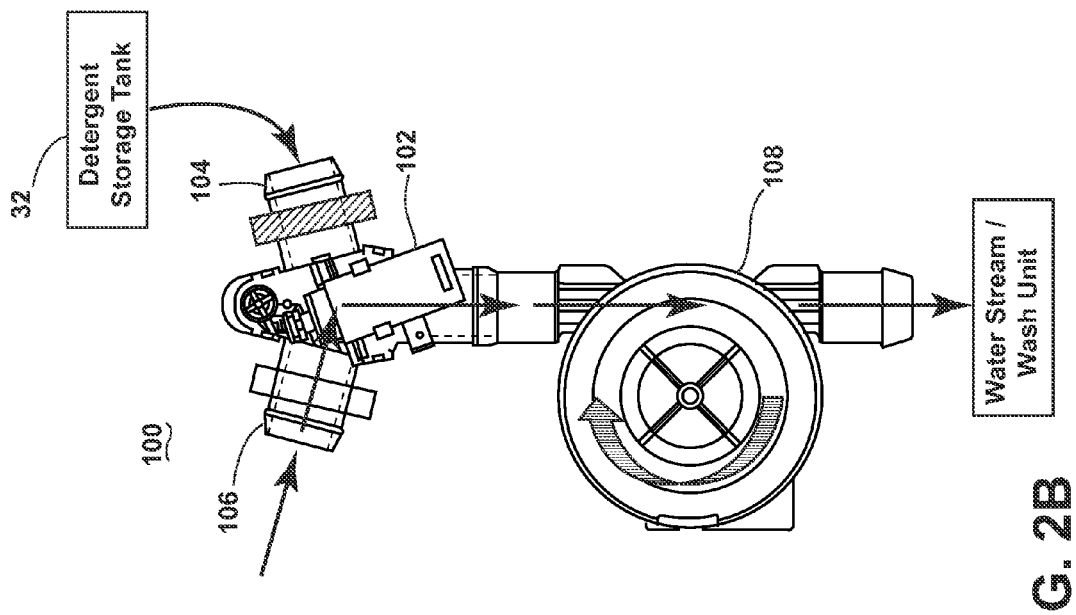
FIG. 2A is a schematic view of one embodiment of the disclosure with the valve open to the detergent dispenser.
Figure 2B:
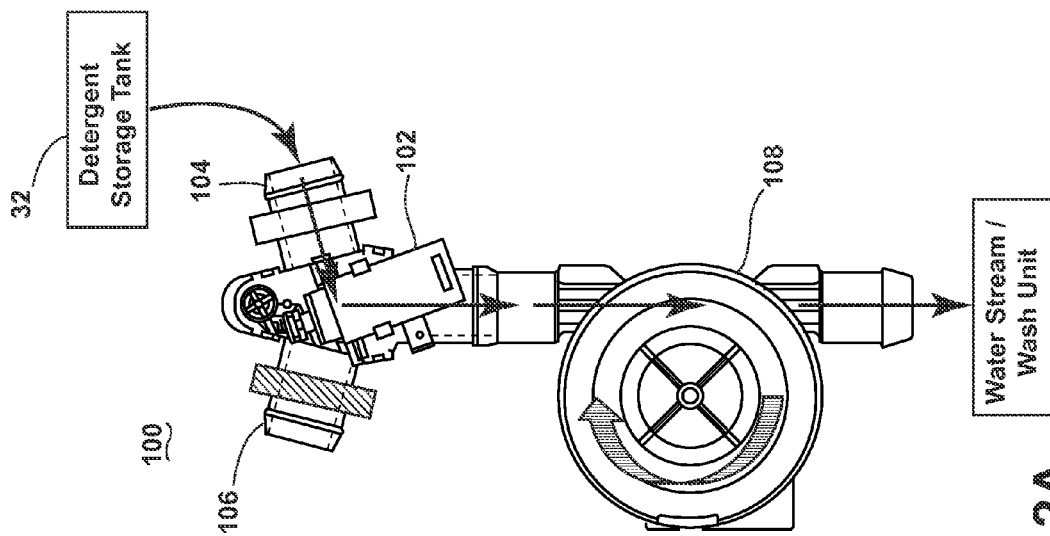
FIG. 2B is a schematic view of one embodiment of the disclosure with the valve open to the air vent.

FIG. 2 illustrates a specific implementation according to one embodiment of the disclosure of a diverter valve 100 that may be installed instead of a pump or other more expensive device. The diverter valve 100 may include a solenoid 102 in mechanical connection to a detergent inlet 104 and an air vent 106. A flow meter 108 may be located further downstream from the detergent inlet 104. In an alternative embodiment (not shown), the flow meter 108 may be located upstream the detergent inlet 104. The diverter valve 100 may also be a different type of valve known in the art, such as a wax motor or synchronous motor.

The diverter valve 100 may be configured to use the natural force of gravity to meter out and dispense an additive from the dispensing cup 32 located above the drum 16 to either a water stream or the drum 16. As shown in FIG. 2, when the solenoid 102 is not energized in the nominal state, the diverter valve 100 may close the detergent inlet 104, such that detergent is blocked from being able to flow through the device and out a detergent outlet 110. When it is time to dispense detergent, the diverter valve 100 may energize the solenoid 102, opening the detergent inlet 104, and closing the air vent 106. This allows gravity to start pulling detergent from the dispensing cup 32, through the diverter valve 100, and out the detergent outlet 110.

The flow meter 108 may be used to measure of the volume of detergent that is being dispensed. With an automatic dosing system, a design target will be established for how much liquid detergent should be used (for example 40-80 mL possibly depending on the cycle selection, soil level selection, and load size). The flow meter 108 may be used as a closed loop feedback device to the diverter valve 100, telling it when to de-energize the solenoid 102. This would return the diverter valve 100 to its nominal state, with the detergent inlet 104 closed, and the air vent 106 open, stopping the detergent flow once a predetermined dosage has been achieved.

The predetermined dosage may be obtained through a number of methods. The dosage may be obtained by the controller 24 after the user has input the desired load size and cycle into the user interface 22. The user may also directly input the amount of desired dosage into the user interface 22. The dosage may also be programmed to the controller 24 or directly to the flow meter 108 at the point of manufacture. The flow meter 108 may have the ability to receive the dosage from the controller 24, and determine when the flow of fluid through the flow meter 108 is substantially equal to the dosage as determined by the controller 24. The flow controller 108 may also relay real-time flow information to the controller 24, and the controller 24 determines when the amount of fluid through the flow meter 108 is substantially equal to the dosage.

The communication between the flow meter 108 and the solenoid 102 may be a direct electrical connection. In this embodiment, the flow meter 108 may be pre-programmed at a point of manufacture, either the point of manufacture of the flow meter 108 or the clothes washing machine 10. When the flow of fluid through the flow meter 108 is substantially equal to the pre-programmed dosage, the flow meter 108 sends a signal to the solenoid 102 to de-energize, thus closing the detergent inlet 104 and opening the air vent 106. In another embodiment, this communication may also be facilitated via electrical signals between the controller 24 and each of the flow meter 108 and the solenoid 102, wherein the flow meter 108 and the solenoid 102 are "dumb" devices, and all of the computation is handled with the controller 24. In this embodiment, the controller 24 sends an electrical signal to the solenoid 102 to open, allowing fluid to pass through the flow meter 108. As fluid flows through the flow meter 108, the flow meter sends electrical signals to the controller related to the amount of fluid flow through the flow meter. These signals may be based on the number of turns a paddle wheel goes through as fluid is passed through the flow meter 108, although the signals may be generated by any other means known in the art. The controller 24 calculates how much fluid has passed through the flow meter 108 based on these signals and when the amount of fluid passing reaches an amount determined by the controller 24, the controller 24 sends an electrical signal to the solenoid 102 to close, stopping the fluid from passing through the flow meter 108 and out the detergent outlet 110.

The diverter valve 100 uses a combination of gravity and air pressure to drive the detergent flow into the drum 16. In its nominal state, the air vent 106 may be open and the detergent dispenser 104 may be closed. In this state, any fluid in the dispensing line 38 is prevented from flowing to the drum because the detergent inlet 104 is closed. However, there may be some residual fluid in the dispensing line 38 downstream the diverter valve 100 and the flow meter 108. With the detergent inlet 104 closed, this residual fluid may not be able to flow into the drum 16, because the line has been cut off from ambient air pressure by the closing of the detergent inlet 104. To ensure all of the required fluid reaches the drum 16, the air vent 106 may be opened, thus opening the portion of the dispensing line 38 that is downstream the diverter valve 100 to ambient air pressure, and allowing the residual fluid to flow into the drum 16.

Figure 3:
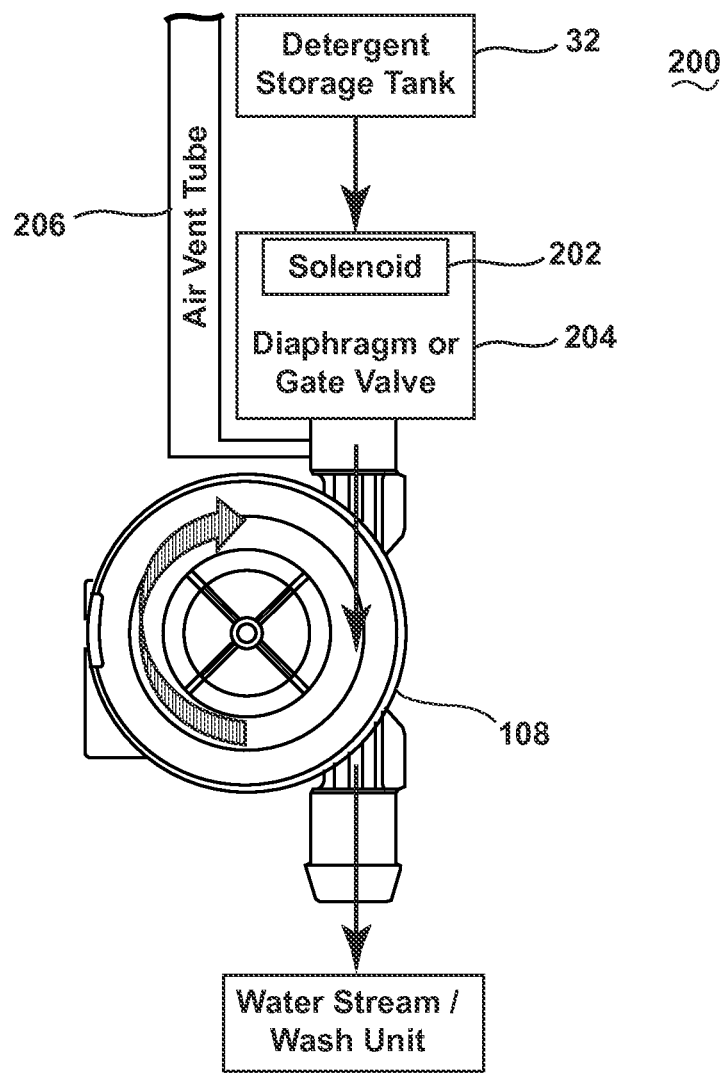
FIG. 3 is a schematic view of another embodiment of the disclosure.

In another embodiment as shown in FIG. 3, the diverter valve 200 may include a solenoid 202 and a detergent inlet 204. The air vent 206 is a direct line to ambient air pressure, and may not have a valve to open and close it. The fluid may then flow through the flow meter 108 as described above, and into the drum 16.

While the disclosure has been specifically described in connection with certain specific embodiments thereof, it is to be understood that this is by way of illustration and not of limitation, and the scope of the appended claims should be construed as broadly as the prior art will permit.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An appliance for washing clothes, comprising:
a dispensing system for dispensing a detergent and having a detergent storage tank;
a water supply line in fluid communication with the dispensing system for supplying water;
a drum;
a diverter valve comprising:
a diverter valve inlet in fluid communication with the dispensing system;
an air vent in fluid communication with ambient air; and
a diverter valve outlet; and
wherein the diverter valve has an energized state wherein the diverter valve inlet is opened and the air vent is closed, and a de-energized state wherein the diverter valve inlet is closed and the air vent is opened; and
a flow meter in fluid communication with the diverter valve outlet and the drum, wherein
both the supplied water and the detergent pass through the diverter valve and the flow meter.

2. The appliance of claim 1, wherein the diverter valve further comprises a solenoid and wherein the diverter valve is configured to receive water and at least one detergent from the dispensing system using gravity.

3. The appliance of claim 1, further comprising a controller operably coupled with the diverter valve configured to move between the energized state and the de-energized state in response to an electrical communication or signal from the controller.

4. The appliance of claim 3, wherein the controller is operably coupled with the flow meter configured to generate an electrical signal based on a predetermined amount of fluid through the flow meter.

5. The appliance of claim 1, wherein the appliance is free of a pump to urge fluid between the dispensing system and the drum.

6. The appliance of claim 4, further comprising a user interface which comprises an input for a user defined amount of detergent.

7. The appliance of claim 6, wherein the user interface is operably coupled with the controller configured to update the predetermined amount of fluid through the flow meter.

8. The appliance of claim 1 wherein the flow meter is disposed downstream from the diverter valve and configured to measure fluid flow amounts passing from the diverter valve and into the drum.

9. The appliance of claim 1, wherein the flow meter is disposed upstream from the diverter valve and configured to measure fluid flow amounts being delivered to the diverter valve.

10. A washing machine, comprising:
a dispensing system for dispensing a detergent and having a detergent storage tank;
a water supply line in fluid communication with the dispensing system for supplying water;
a cleaning chamber;
a diverter valve comprising:
a diverter valve inlet;
a diverter valve outlet;
an air vent in fluid communication with ambient air; and
a solenoid mechanically engaged with and configured to open and close the diverter valve inlet;
an upper dispensing line comprising:
an upper dispensing line inlet in fluid communication with the dispensing system; and
an upper dispensing line outlet in fluid communication with the diverter valve inlet;
a lower dispensing line comprising:
a lower dispensing line inlet in fluid communication with the diverter valve outlet; and
a lower dispensing line outlet in fluid communication with the cleaning chamber;
a flow meter in fluid communication with the diverter valve outlet and the lower dispensing line;
wherein the diverter valve has an energized state wherein the diverter valve inlet is opened and the air vent is closed, and a de-energized state wherein the diverter valve inlet is closed and the air vent is opened; and
wherein both the supplied water and the detergent from the detergent storage tank pass through the diverter valve and the flow meter.

11. The washing machine of claim 10, wherein the solenoid is mechanically engaged with and configured to open and close the air vent and wherein the ambient air is outside the washing machine.

12. The washing machine of claim 11, wherein when the diverter valve is in the energized state, the air vent is closed, and when the diverter valve is in the de-energized state, the air vent is open.

13. The washing machine of claim 10, further comprising:
a controller in electrical communication with the solenoid and the flow meter; and
a user interface in electrical communication with the controller.

* * * * *